United States Patent [19]
Wiedeman

[11] Patent Number: 6,160,994
[45] Date of Patent: *Dec. 12, 2000

[54] INTERACTIVE FIXED AND MOBILE SATELLITE NETWORK

[75] Inventor: Robert A Wiedeman, Los Altos, Calif.

[73] Assignee: Globalstar L.P., San Jose, Calif.

[*] Notice: This patent is subject to a terminal disclaimer.

[21] Appl. No.: 09/090,521

[22] Filed: Jun. 4, 1998

Related U.S. Application Data

[63] Continuation of application No. 08/772,073, Dec. 19, 1996.

[51] Int. Cl.$^7$ ........................ H04B 7/185; H04B 7/216; H04M 11/00; H04M 1/00; B64G 1/00
[52] U.S. Cl. .................. 455/12.1; 455/13.1; 455/405; 455/556; 249/158 R; 370/320; 375/200
[58] Field of Search ................................ 375/200, 320; 455/405, 556, 12.1, 13.1; 244/158 R

[56] References Cited

U.S. PATENT DOCUMENTS

| Re. 32,905 | 4/1989 | Baran ...................................... 370/104 |
| 4,901,307 | 2/1990 | Gilhousen et al. ...................... 370/18 |
| 5,010,317 | 4/1991 | Schwendeman et al. ............ 340/311.1 |

(List continued on next page.)

FOREIGN PATENT DOCUMENTS

| 0 421 698 A2 | 10/1991 | European Pat. Off. . |
| WO 90/13186 | 11/1990 | WIPO . |
| WO 91/09473 | 6/1991 | WIPO . |
| WO 93/09613 | 5/1993 | WIPO . |

OTHER PUBLICATIONS

"Matra Marconi Proposing Hybrid Broadband Geo–Leo System", Space Business News, Nov. 27, 1996, p. 8.

MAGSS–14: A Medium–Altitude Global Mobile Satellite System for Personal Communications at L–band, J. Benedicto et al., 1992, 17 pages.

Khan, "Global Digital Satellite Highway", Tenth International Conference Digital Satellite Communications, 1995, 1994.

Daryoush, Ackerman, Saedi, Kunath, Shalhauser, "High–Speed Fiber–Optic Links for Distribution of Satellite Traffic", IEEE, 1990.

(List continued on next page.)

*Primary Examiner*—William Cumming
*Attorney, Agent, or Firm*—Ohlandt, Greeley, Ruggiero & Perle, L.L.P.

[57] ABSTRACT

A communications system includes at least one low earth orbit first satellite (10), at least one second satellite (11) in other than a low earth orbit, and a ground segment (12) that includes a plurality of user transceivers (78, 80, 82, 84) and at least one gateway (76) coupled to a publicly-accessible terrestrial communications system, such as a PSTN and/or a fiber optic network. The first satellite includes a first transceiver for communication with the at least one gateway, a second transceiver for communication with at least one user transceiver, and a third transceiver for communication with the at least one second satellite. The first, second and third transceivers are switchably coupled together on-board the first satellite by on-board processors, and a switching matrix for relaying a user communication between the at least one gateway and the at least one user transceiver via the at least one second satellite. The plurality of user transceivers can include a plurality of data processors which are interconnected into a network through the at least one first satellite. This network can be considered as a virtual network, and can have a mesh, star, or other topology. The user transceivers can be adapted to transmit and receive direct sequence, code division/multiple access communications. Transmission of signals to and from the user transceivers is accomplished by spreading a digital data stream (e.g., voice, data, image, video) with assigned spreading codes.

9 Claims, 6 Drawing Sheets

U.S. PATENT DOCUMENTS

| | | | |
|---|---|---|---|
| 5,073,900 | 12/1991 | Mallinckrodt | 375/1 |
| 5,081,703 | 1/1992 | Lee | 455/13 |
| 5,109,390 | 4/1992 | Gilhousen et al. | 375/1 |
| 5,119,225 | 6/1992 | Grant et al. | 359/172 |
| 5,216,427 | 6/1993 | Yan et al. | 342/352 |
| 5,233,626 | 8/1993 | Ames | 375/1 |
| 5,239,671 | 8/1993 | Linquist et al. | 455/13.1 |
| 5,265,119 | 11/1993 | Gilhousen et al. | 375/1 |
| 5,303,286 | 4/1994 | Wiedeman | . |
| 5,339,330 | 8/1994 | Mallinckrodt | 375/1 |
| 5,410,728 | 4/1995 | Bertiger et al. | 455/13.1 |
| 5,415,368 | 5/1995 | Horstein et al. | 244/158 R |
| 5,422,647 | 6/1995 | Hirshfield et al. | 342/354 |
| 5,433,726 | 7/1995 | Horstein et al. | 244/158 R |
| 5,439,190 | 8/1995 | Horstein et al. | 244/158 |
| 5,446,756 | 8/1995 | Mallinckrodt | 375/200 |
| 5,448,623 | 9/1995 | Wiedeman et al. | . |
| 5,526,404 | 6/1996 | Wiedeman et al. | . |
| 5,551,624 | 9/1996 | Horstein et al. | 244/158 R |
| 5,594,780 | 1/1997 | Wiedeman et al. | . |
| 5,617,100 | 4/1997 | Akiyoshi et al. | 342/357 |
| 5,619,525 | 4/1997 | Wiedeman et al. | 375/200 |
| 5,655,005 | 8/1997 | Wiedeman et al. | 370/320 |
| 5,664,006 | 9/1997 | Monte et al. | 455/405 |
| 5,722,042 | 2/1998 | Kimura et al. | 455/13.1 |
| 5,758,293 | 5/1998 | Frasier | 455/556 |
| 5,802,445 | 9/1998 | Wiedeman et al. | 455/12.1 |
| 5,890,679 | 4/1999 | Chethik | 244/158 R |
| 5,896,558 | 4/1999 | Wiedeman | 455/12.1 |

OTHER PUBLICATIONS

Jennings, "Hybrid Digital Networks Using High–Speed Optical Fiber and Advanced Satellite Systems", IEEE, Jul. 1993.

Select Committee of the United States House of Representatives, "U. S. National Security and Military/Commercial Concerns with the People's Republic of China", Overview, Jan. 3, 1999.

Space System Loral, "Inventing the Future–Space System/Loral Patents", 1998.

Petition of American Mobile Satellite Corporation Before the FCC, Washington, DC 20554, dated Jun. 3, 1991, pp. 1–15.

Application of Motorola Satellite Communications, Inc. for Iridium A Low Earth Orbit Mobile Satellite System before the FCC, Washington, D.C. Dec. 1990, pp. 49–96.

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. for Authority to Construct a New Communications Satellite System Odyssey before the FCC, Washington, D.C. 20554, May 31, 1991 pp. 33–51.

Application of Ellipsat Corporation Ellipsat for the Authority to Construct Ellipso$^R$I An Elliptical Orbit Satellite System, before the FCC, Washington, D.C. 20554, Nov. 2, 1990, pp. 5–34.

Application of Loral Cellular Systems, Corp., Globalstar Mobile COmmunications Wherever You Are, before the FCC, Washington, D.C. Jun. 3, 1991, pp. 94–187.

"An Integrated Satellite–Cellular Land Mobile System for Europe", E. Del Re, University of Florence, Dept. of Electronics Engineering, Italy, Sep. 21, 1989.

Current and Future Mobile Satellite Communication Systems, S. Kato et al., IEICE Transactions, vol. F 74, No. 8 Aug. 1991, pp. 2201–2210.

"Digital Network Oriented Mobile Radio Satellite System as an Integrated Part of The GSM Cellular Radio System in Europe", P. Dondl, Deutsch BUndespost/Fernmeldetechniches Zentralmt/Darmstadt, Fed. Rep. Germ. Sep. 21, 1989.

"The OmniTRACS$^R$ Mobile Satellite Communications and Positioning System", E. Tiedemann, Jr. et al., Vehicle Electronics in the 90's: Proceedings of the In'l. Congress on Transportation Electronics, Oct. 1990.

"Software Implementation of a PN Spread Spectrum Receiver to Accommodate Dynamics", C. Cahn et al., IEEE Trans. on Comm., vol. COM–25, No. 8, Aug. 1977.

"A Communication Technique for Multipath Channels", R. Price, Proceedings of the IR, Mar. 1958, pp. 555–570.

"Increased Capacity Using CDMA for Mobile Satellite Communication", K. Gilhousen et al., IEEE Journal on Selected Areas in Communications, vol. 8, No. 4, May 1990, pp. 503–514.

"The Iridium$^{TM}$ System—A Revolutionary Satellite Communications System Developed with Innovative Applications of Technology", D. Sterling et al., IEEE, MILCOM 1991, Nov. 4–7.

"Iridium: Key to Worldwide Cellular Communications", J. Foley, Telecommunications, Oct. 1991, pp. 23–28.

INTERACTIVE FIXED AND MOBILE SATELLITE NETWORK

This application is a continuation of copending application Ser. No. 08/772,073 filed on Dec. 19, 1996.

FIELD OF THE INVENTION

This invention relates generally to communications systems and, in particular, to communications systems that employ one or more satellites to direct user communications through the system.

BACKGROUND OF THE INVENTION

Satellite delivered individual services are emerging as a new global enterprise. These systems utilize or are proposed to utilize many individual circuits routed through one satellite or a constellation of many satellites to effect communications. One value of the satellite system is that it provides ubiquitous coverage of large areas of the earth without the construction of ground-based infrastructure. Since the recent availability of portions of the frequency spectrum for these services, several proposals have been advanced by a number of organizations. One proposal would use Time Division Multiple Access (TDMA), while several others would employ Code Division Multiple access (CDMA). A feature of the CDMA systems is an ability to share the available frequencies by cofrequency operation, while experiencing only a percentage decrease in the capacity of each system.

Furthermore, Low Earth Orbiting Satellite (LEOS) systems, also referred to as Non-GSO (geosynchronous orbit) satellite systems, offer a new dimension in communications. For example, the LEOS systems can provide diversity, as described in U.S. Pat. No. 5,233,626, issued Aug. 3, 1993, entitled "Repeater Diversity Spread Spectrum Communication System", to Stephen A. Ames. Another capability provided by the LEOS systems is an ability to interconnect users to a fixed point, typically referred to as a Public Switched Telephone Network (PSTN).

High capacity, fiber optic-based communications is currently being deployed world-wide, and in particular in the United States, to directly connect to subscribers in their homes. In addition to providing conventional voice communication capability, the fiber optic-based networks can also provide video and high speed data capabilities. The proliferation of networked personal computers having multimedia capabilities can take advantage of the increased speed and capacity provided by the fiber optic based networks. However, the significant costs involved in providing fiber optic lines is not economical in every locale, and it can be expected that large non-urban areas will not be in a position to benefit from the advantages provided by fiber optic networks within a reasonable period of time.

OBJECTS OF THE INVENTION

It is a first object of this invention to provide a system and a method for providing communications services to regions which are not currently economical to serve with fiber optics.

It is a further object of this invention to provide a satellite-based communications system that provides, in addition to mobile and fixed voice and data service, a capability to provide high speed video and data service.

SUMMARY OF THE INVENTION

The foregoing and other problems are overcome and the objects of the invention are realized by a communications system that is constructed and operated in accordance with this invention. The communications system includes at least one low earth orbit first satellite, and preferably a constellation of multiple low earth orbit repeater satellites. The satellites of the constellation are preferably in inclined circular orbits operating at an altitude of less than 2000 kilometers. The communications system also includes at least one, and preferably a plurality of second satellites in other than a low earth orbit, such as a geosynchronous orbit. The communications system also includes a ground segment having a plurality of user transceivers and at least one gateway coupled to a publicly-accessible terrestrial communications system and/or to various private networks, such as a PSTN and/or a fiber optic network. The first satellite(s) include a first transceiver for communication with the at least one gateway, a second transceiver for communication with at least one user transceiver, and a third transceiver for communication with the at least one second satellite. The first, second and third transceivers are switchably coupled together on-board the first satellite for relaying user communications, such as voice, data, image, and video, between the at least one gateway and the at least one user transceiver via the at least one second satellite.

The at least one first satellite further includes a first on-board processor that is bidirectionally coupled to the first transceiver; a second on-board processor that is bidirectionally coupled to the second transceiver; and a switching network that is bidirectionally coupled to the first and second on-board processors and to the third transceiver for selectively establishing communication paths between the first and second on-board processors and the third transceiver.

The plurality of user transceivers can include a plurality of data processors which are interconnected into a network through the at least one first satellite. This network can be considered as a virtual network, and can have a mesh, star, or other topology. In a presently preferred, but not limiting embodiment of this invention, the user transceivers are adapted to transmit and receive direct sequence, code division/multiple access (DS-CDMA) communications, wherein the transmission of signals to and from the user transceivers is accomplished by spreading a digital data stream (e.g., voice, data, image, video) with predetermined spreading codes.

BRIEF DESCRIPTION OF THE DRAWINGS

The above-set forth and other features of the invention are made more apparent in the ensuing Detailed Description of the Invention when read in conjunction with the attached Drawings, wherein.

DETAILED DESCRIPTION OF THE INVENTION

Figure 1:
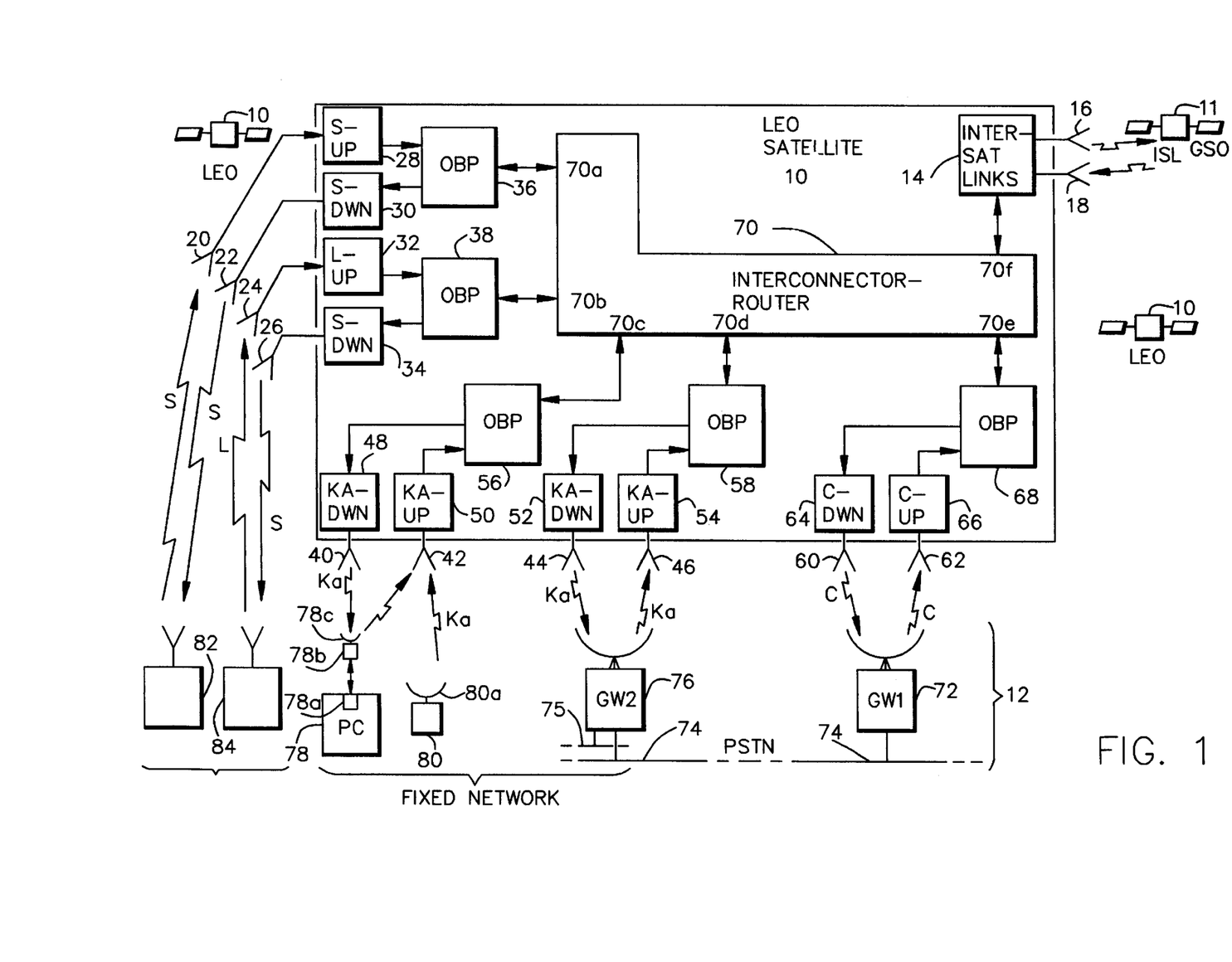
FIG. 1 is a block diagram of a satellite-based communications system in accordance with this invention.

Reference is made to FIG. 1 for illustrating an exemplary embodiment of this invention. At least one and preferably a plurality of satellites 10 are provided in earth orbit. The satellites 10 may form a constellation of low earth orbit satellites (LEOS), such as a constellation of 48 satellites orbiting at less than 2000 kilometers, such as about 1400 kilometers, in several inclined orbital planes. The orbits may be circular, although the teaching of this invention is not limited for use only with circular orbits. Coupled to the satellites 10 via uplink and downlink RF signals and associated transceivers is a terrestrial or ground segment 12. The satellites 10 operate so as to interconnect various elements of the ground segment 12 through different portions of the frequency spectrum via a plurality of RF transmitters and receivers (transceivers), on-board processors, and a switching matrix capable of interconnecting any one of the on-board processors to another. A provision is also made for coupling to other satellites of the same and/or a different constellation though inter-satellite links (ISL), such as RF or optical links.

In the presently preferred embodiment of this invention the satellites 10 include circuitry 14 and antennas 16 and 18 for providing inter-satellite links with other satellites 11, such as a higher-orbiting geosynchronous orbit (GSO), medium earth orbit (MEO), or Molniya constellation of satellites. In this manner a given communication signal can be uplinked from a portion of the ground segment 12 to one of the satellites 10, and can then be routed through one or more other satellites 11 before being downlinked back to the ground segment 12, either directly or through another LEO satellite 10. This link may be bidirectional (e.g., full duplex).

The antennas 16 and 18 may be either non-deployed phased arrays or deployed reflectors with multiple beam feed assemblies located in a reflector focal plane.

Describing FIG. 1 now in greater detail, the satellite 10 includes an S-band receive antenna 20, an S-band transmit antenna 22, an L-band receive antenna 24 and an S-band transmit antenna 26. S-band antennas 20 and 22 may operate at frequencies of 2.2 and 1.9 GHz, respectively, with a bandwidth of 30 MHz. The L-band antenna 24 may operate at 1.6 GHz, while the downlink S-band antenna 26 may operate at 2.5 GHz. The antennas 20 and 22 may be either nondeployed phased arrays, deployed phased arrays, or deployed reflectors with multiple beam feeds located at the focal plane of the reflector. The bandwidth of the L-band and S-band transmissions through antennas 24 and 26 may be 16.5 MHz. Coupled to antennas 20–26 are respective RF circuit blocks 28–34 respectively. The RF circuit blocks 28–34 include suitable signal modulators and demodulators, as appropriate. A presently preferred access technique employs a direct sequence (DS), code division/multiple access (CDMA) technique. This invention is not, however, limited to only a DS-CDMA approach. By example, a suitable time division/multiple access (TDMA) technique can also be used.

In the case of DS-CDMA, each RF circuit block includes circuitry for phase demodulating and despreading received communications using user-assigned pseudo-noise (PN) spreading codes to separate a plurality of user signals that occupy a same portion of the bandwidth of the uplinked RF signal. The result is a plurality of digital data streams that are input to an on-board processor (OBP) 36 for processing and routing. Transmission of signals to the users is accomplished by spreading a digital data stream (e.g., voice, data, image, video) that is received from the OBP 36 with assigned spreading codes, and then phase modulating the spread communications prior to transmission.

Bidirectionally coupled to the S-band antenna/RF block pair 20, 22, 28 and 30 is the first on-board processor (OBP) 36. Coupled to the L-band, S-band antenna/RF block pair 24, 26, 32 and 34 is a second on-board processor 38. As was indicated above, the on-board processors 36 and 38 receive communications signals that have been down-converted to baseband and demodulated (i.e., taken down to bits) within the respective RF blocks 28 and 32. Routing and other information within the communications, for example destination addresses associated with data packets of speech, video, or data, is examined by the OBP for destination and other information, and is thence routed through an interconnector-router (ICR) block 70 to another OBP for completing a required circuit. The ICR block 70 can be comprised of a cross-bar or similar switching arrangement that is programmed by the OBPs so as to establish and maintain non-blocking communication paths between its various input and output (I/O) ports 70a–70f. The ICR block 70 is thus able to controllably route communication signals to and from the various ones of the OBPs and also, if provided, other satellites 10 via the inter-satellite links block 14 and its associated antennas 16 and 18, via the satellite(s) 11. This interconnection capability enables a variety of ground segment terminal and equipment types to be coupled together, and to be coupled to an underlying communications infrastructure (e.g., PSTN and/or fiber optic network) through one or more satellites 10 and/or 11.

The satellite 10 further includes a first Ka-band (userlink) transmit antenna 40, a first Ka-band (user-link) receive antenna 42, a second Ka-band (feederlink) transmit antenna 44, and a second Ka-band (feederlink) receive antenna 46. The Ka-band antennas may operate at about 19 GHz (receive) and about 28 GHz (transmit), bandwidth 400 MHz, and provide the high speed, high capacity user links that are a feature of this invention. These antennas may be either non-deployed phased arrays, deployed phased arrays, or deployed reflectors with multiple beam feeds located at the focal plane of the reflector. Coupled to antennas 40–46 are respective RF circuit blocks 48–54 respectively. The RF circuit blocks 48–54 include suitable signal modulators and demodulators, as appropriate. OBPs 56 and 58 are bidirectionally connected to the RF circuit blocks 48, 50 and 52, 54, respectively, and also to the ICR 70.

The satellite 10 also includes, by example, a Ka-band or a C-band (feederlink) transmit antenna 60 and a Ka-band or a C-band receive (feederlink) antenna 62. For a presently preferred C-band embodiment the feederlinks operate in the range of 3 GHz to 7 GHz. Coupled to antennas 60 and 62 are respective RF circuit blocks 64 and 66, respectively. The RF circuit blocks 64 and 66 include suitable signal modulators and demodulators, as appropriate. The OBP 68 is bidirectionally connected to the RF circuit blocks 64 and 66, and also to the ICR 70.

Turning now the ground segment 12, there are provided a plurality of terrestrial data, or data and/or voice networks and also fixed and mobile user terminals. The ground segment 12 includes first gateways 72 having transceivers for communicating with the satellite C-band antennas 60 and 62. These transmissions are feederlinks through which voice and data communications can be directed to and from a terrestrial public switched telephone network 74 (PSTN) and, by example, the user terminals 82 and 84. The various terminals and other equipment designated as 78, 80, 82 and 84 may all be considered to be subscriber or user terminals or transceivers.

Figure 2:
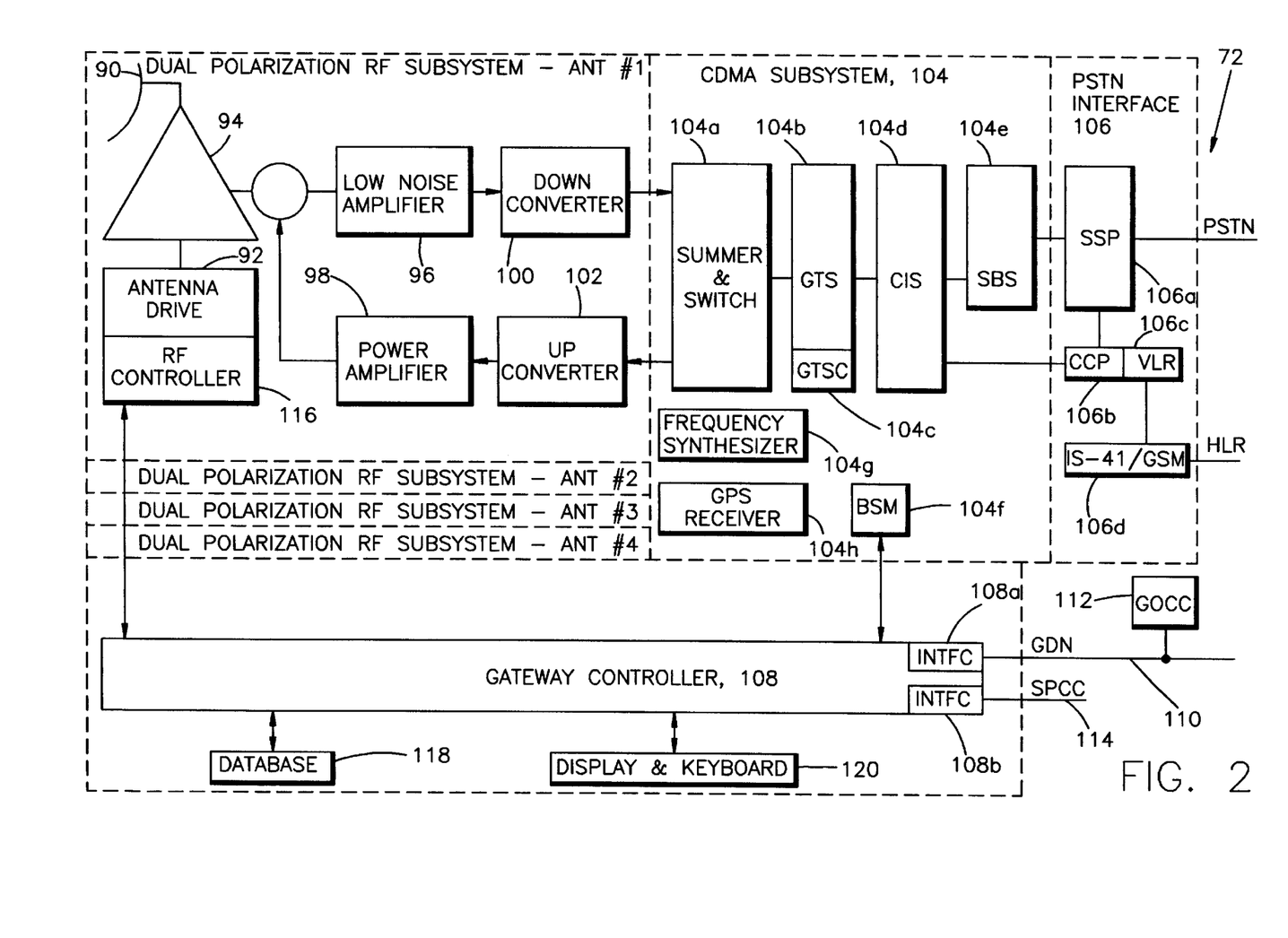
FIG. 2 is a block diagram of one of the gateways illustrated in FIG. 1.

FIG. 2 shows the gateway 72 in greater detail, it being realized that typically a plurality of the gateways are provided for serving different geographical areas. Each gateway 72 includes up to four dual polarization RF C-band subsystems each comprising an antenna 90, antenna driver 92 and pedestal 94, low noise receivers 96, and high power amplifiers 98. All of these components may be located within a radome structure to provide environmental protection.

The gateway 72 further includes down converters 100 and up converters 102 for processing the received and transmitted RF carrier signals, respectively. The down converters 100 and the up converters 102 are connected to a CDMA subsystem 104 which, in turn, is coupled to the Public Switched Telephone Network (PSTN) though a PSTN interface 106. As an option, the PSTN could be bypassed by using satellite-to-satellite links.

The CDMA sub-system 104 includes a signal summer/switch unit 104a, a Gateway Transceiver Subsystem (GTS) 104b, a GTS Controller 104c, a CDMA Interconnect Subsystem (CIS) 104d, and a Selector Bank Subsystem (SBS) 104e. The CDMA sub-system 104 is controlled by a Base Station Manager (BSM) 104f and functions in a manner similar to a CDMA-compatible (for example, an IS-95 compatible) base station. The CDMA sub-system 104 also includes the required frequency synthesizer 104g and possibly a Global Positioning System (GPS) receiver 104h.

The PSTN interface 106 includes a PSTN Service Switch Point (SSP) 106a, a Call Control Processor (CCP) 106b, a Visitor Location Register (VLR) 106c, and a protocol interface 106d to a Home Location Register (HLR). The HLR may be located in a cellular gateway or in the PSTN interface 106.

The gateway 72 is connected to telecommunication networks through a standard interface made through the SSP 106a. The gateway 72 provides an interface and connects to the PSTN via a Primary Rate Interface (PRI), or other suitable means. The gateway 72 is further capable of providing a direct connection to a Mobile Switching. Center (MSC).

The gateway 72 may provide SS-7 ISDN fixed signalling to the CCP 106b. On the gateway-side of this interface, the CCP 106b interfaces with the CIS 106d and hence to the CDMA sub-system 104. The CCP 106b provides protocol translation functions for the system Air Interface (AI), which may be similar to the IS-95 Interim Standard for CDMA communications.

Blocks 106c and 106d generally provide an interface between the gateway 72 and an external cellular telephone network that is compatible, for example, with the IS-41 (North American Standard, AMPS) or the GSM (European Standard, MAP) cellular systems and, in particular, to the specified methods for handling roamers, that is, users who place calls outside of their home system.

Overall gateway control is provided by a gateway controller 108 which includes an interface 108a to a Ground Data Network (GDN) 110 which interconnects the various gateways one to another and to Ground Operations Control Center (GOCC) 112. An interface 108b to a Service Provider Control Center (SPCC) 114 can also be provided. The gateway controller 108 is generally interconnected to the gateway 72 through the BSM 104f and through RF controllers 116 associated with each of the antennas 90. The gateway controller 108 is further coupled to a database 118, such as a database of users, satellite ephemeris data, etc., and to an I/O unit 120 that enables service personnel to gain access to the gateway controller 108.

Referring now again to FIG. 1, the ground segment 12 further includes a fixed terrestrial network having a second gateway 76 that is bidirectionally connected to the Ka-band antennas 44 and 46 of the satellite 10. Gateway 76 is also connected to the PSTN 74 and is also connected to a fiber optic network 75 through a suitable fiber optic interface. The gateway 76 can communicate with a number of different types of equipment such as data processors (e.g., multimedia PCs 78 having a suitable RF interface 78a connected to a suitable RF front end 78b and a Ka-band antenna 78c). Other devices, such as user entertainment equipment 80 (e.g. television) can also be accommodated. The other devices can also be interfaces to a wireless local loop (WLL) of a type that serves an office building, residential area, etc. In these cases the other equipment 80 is also provided with suitable RF circuitry and a Ka-band antenna 80a. The units 78 and 80 can be considered to form one or more virtual mesh, star or other network types having a capability to be interconnected via the satellites 10, gateway 76, the PSTN 74, and the fiber optic network 75. By example only, a 400 MHz bandwidth, 1 MB/sec data link capability is provided between the units 78, 80 and the second gateway 76, thereby enabling the delivery of, by example, video, image and Internet services.

In accordance with an aspect of this invention the system disclosed in FIG. 1 can provide a global, wideband Internet access capability with negligible connectivity time. The invention also enables a direct video download to a TV/PC, enables the use of interactive video, and also enables 2-way videophone capability. Interoperability with mobile communication devices 82 and 84 (e.g., handheld or fixed user terminals) is also provided (via the first gateway 72 or the second gateway 76), as is interoperability with various terrestrial wireless local loop systems.

Figure 3:
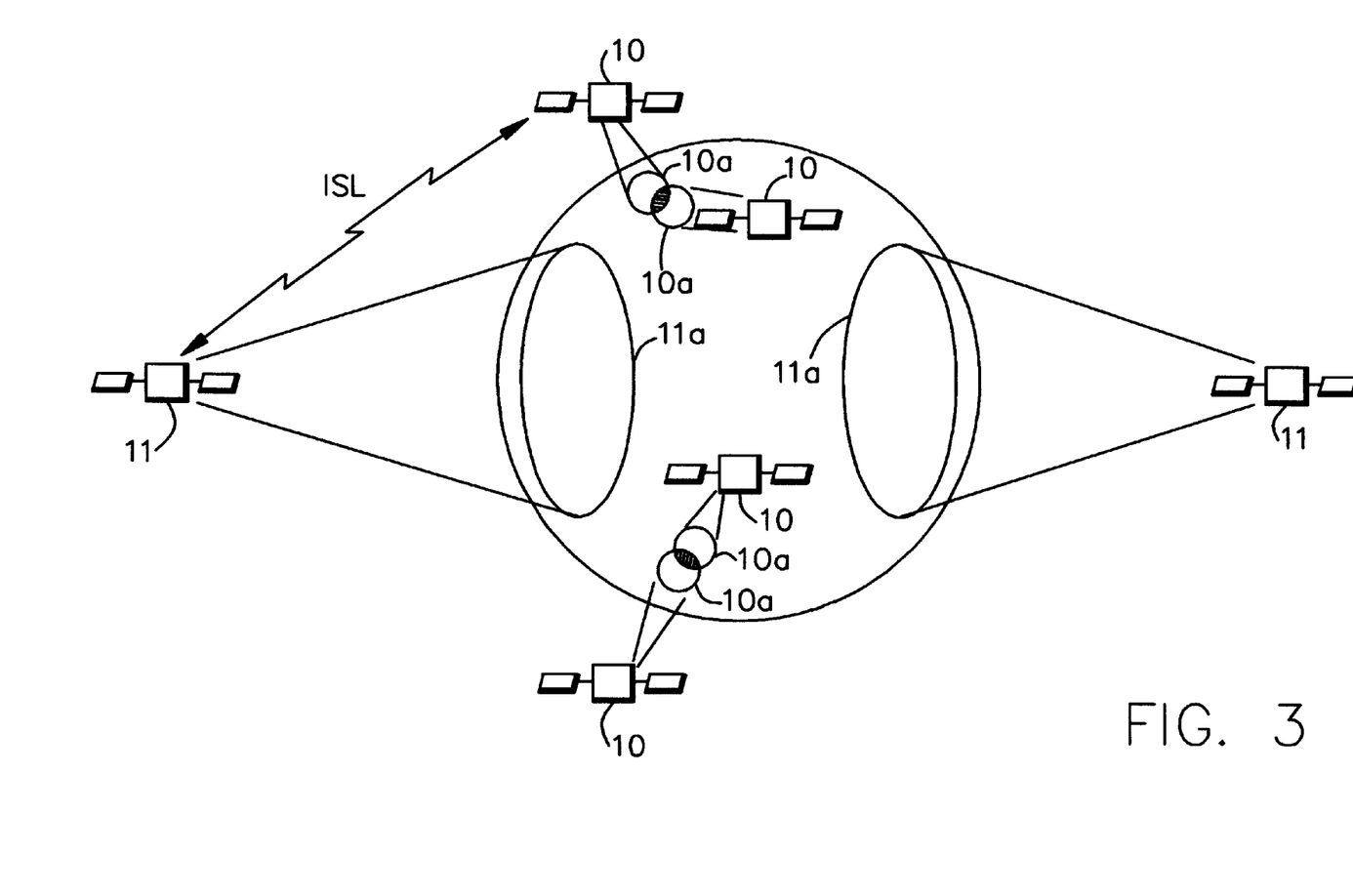
FIG. 3 illustrates a constellation of LEO satellites having inter-satellite links with a constellation of GSO, MEO, or other, higher orbiting, satellites.

Reference is now made to FIG. 3 for illustrating a further aspect of the instant invention. The sphere generally indicates the surface of the earth over which traverse a plurality of the LEO satellites 10. Each satellite 10 has a beam coverage area on the surface of the earth indicated generally as 10a. The beam coverage areas may overlap, thus providing for diversity reception by user terminals and other equipment located within the overlap region. Also shown are a plurality of the other satellites 11 which are in a higher orbit, such a geosynchronous orbit (GSO) or a medium-earth orbit (MEO). Other orbits, such as a Molniya orbit, can also be used. Each satellite 11 has a corresponding larger coverage region indicated by 11a.

In this aspect of the invention the LEO satellites 10 are connected to, by example, the GSO satellites 11 via the inter-satellite links (ISL). In this manner transmissions from the region 10a can be relayed to the larger region 11a, and vice versa. The regions can be closely spaced apart, or can be located on opposite sides of the earth.

Figure 4:
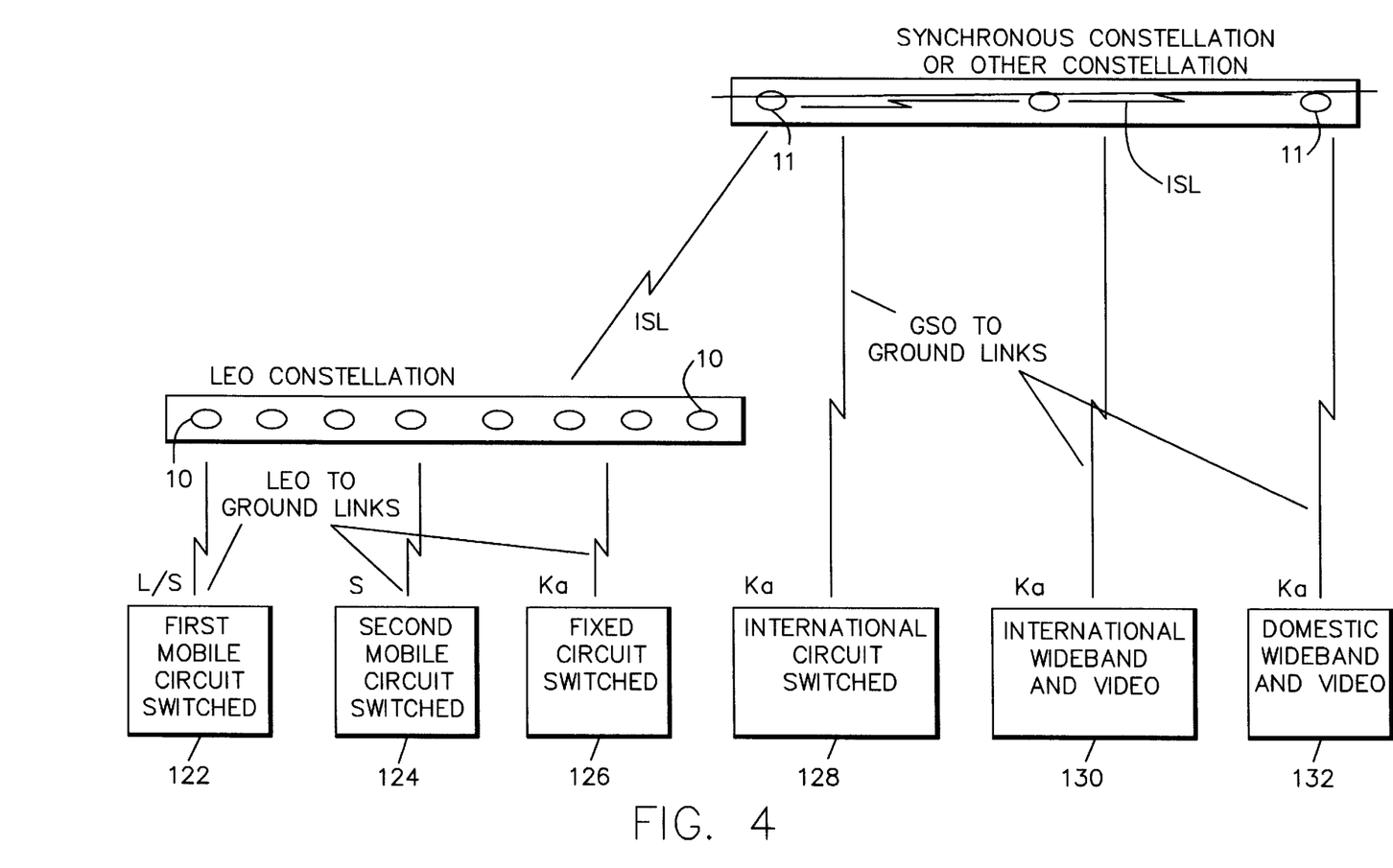
FIG. 4 illustrates various service types and their connectivity through the LEO and GSO satellite constellations.

Reference in this regard can also be made to FIG. 4 for illustrating various types of interconnectivity between and functionality of the various terrestrial terminals and the LEO constellation, either directly or via the synchronous or other constellation type. By example, the block 122, designated First Mobile Circuit Switched, communicates using the L-band and S-band satellite antennas 24 and 26 of FIG. 1, and can include mobile voice, cellular extension, GSM compatibility, and world roaming. The block 124, designated Second Mobile Circuit Switched, communicates using the S-band satellite antennas 20 and 22 of FIG. 1, and can include mobile voice, PCS extension, FPLMTS compatibility, and world roaming. The block 126, designated Fixed Circuit Switched, communicates using the Ka-band satellite antennas 40 and 42 of FIG. 1, and can include fixed voice and data, fiber optics extension, medium speed data, private networks, and internet services. The block 128 (also Ka-band), designated International Circuit Switched, communicates via, by example, the GSO constellation and can provide a transport facility, an extended circuit switched network, international long lines, private networks, and international Internet. The block 130, designated International Wideband and Video, can include international video and wideband data distribution, regional video, and wideband data. The block 132, designated Domestic Wideband and Video, can provide domestic video and wideband data distribution. All of these various functions and features can be simultaneously active and interconnected through the constellation of LEO satellites 10 and the GSO (or other constellation type) satellites 11 via the ISL. It should be noted in FIG. 4 that inter-satellite links are also preferably provided between the GSO satellites 11.

Figure 5:
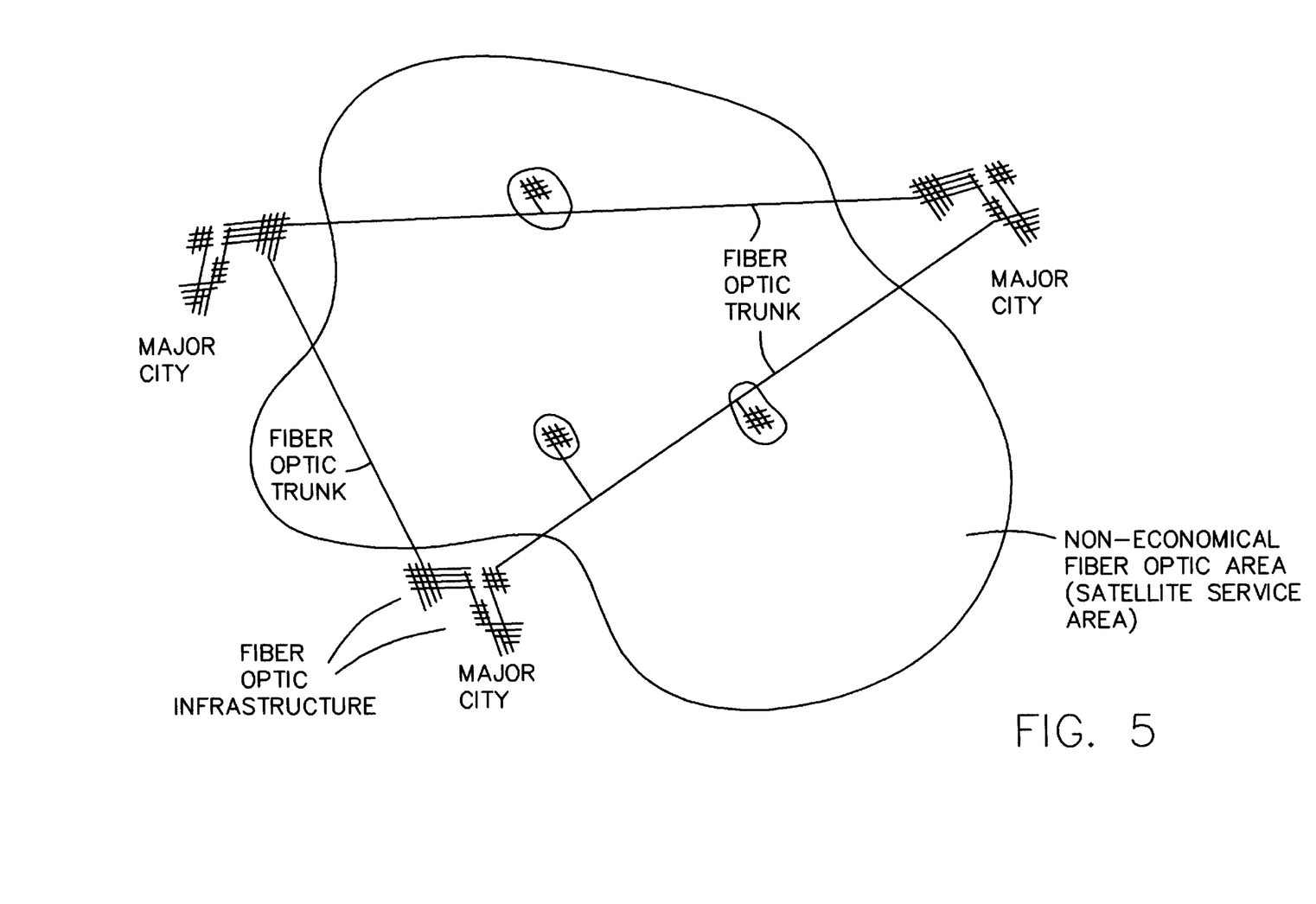
FIG. 5 schematically illustrates various geographical regions having extensive, medium, and non-existent fiber optic service.

FIG. 5 illustrates an exemplary case where fiber optic cables are routed between major cities and metropolitan areas. Within the major cities and metropolitan areas an extensive fiber optic infrastructure may exist. Between these areas the fiber optic service is only marginally provided, such as in the smaller city and town regions that are tapped into the fiber optic trunks that interconnect the larger cities and metropolitan areas. Other areas have no local fiber optic service. However, and in accordance with an aspect of this invention, the satellite service area 10a covers this region of little or no fiber optic service and provides an equivalent service via the fixed portion of the ground network 12 shown in FIG. 1 (i.e., the gateway 76, Ka links, satellites 10, and terminals 78 and 80).

Figure 6:
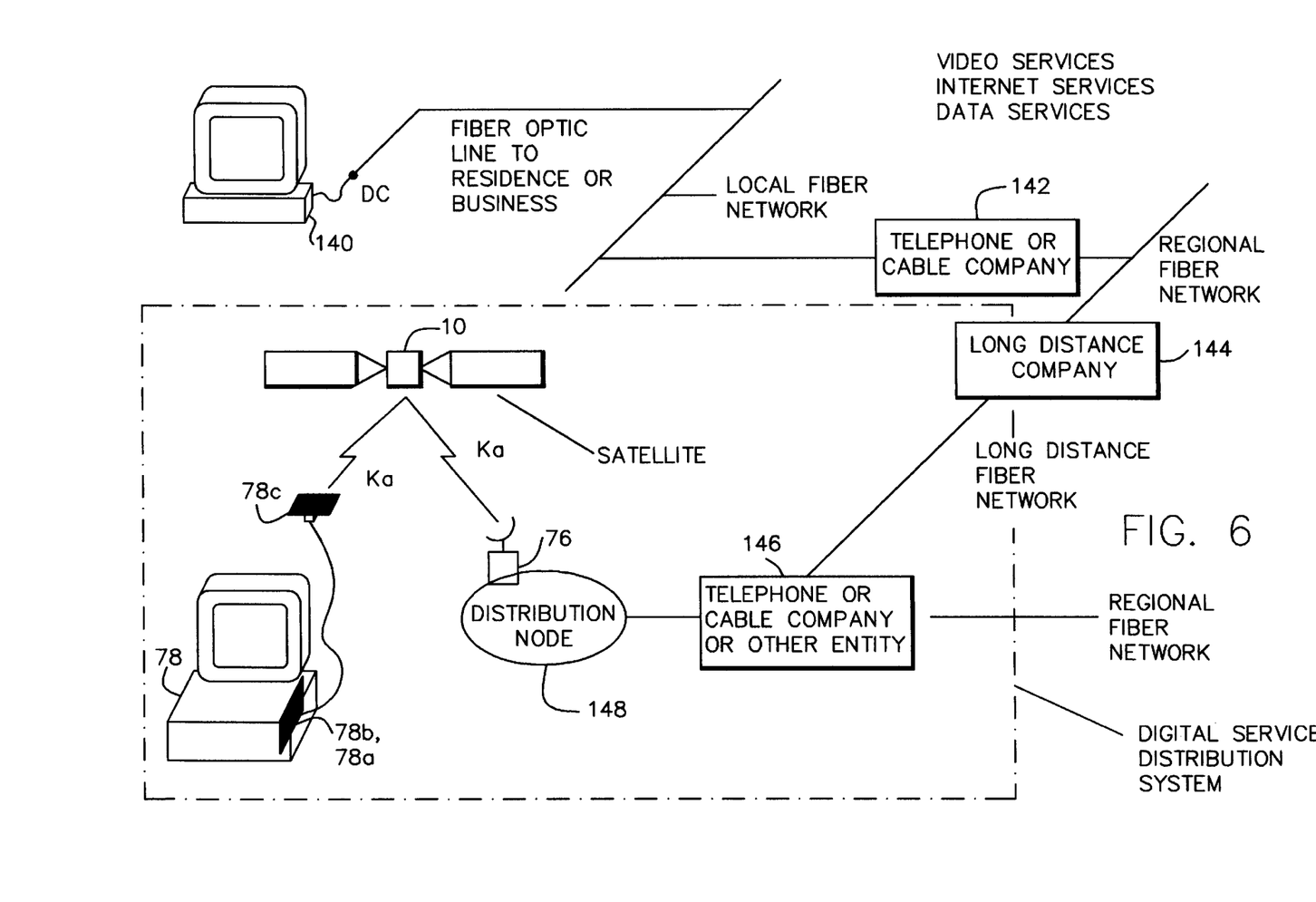
FIG. 6 schematically illustrates a plurality of data processors that are connected directly and indirectly (through a satellite and gateway) to a fiber optic network.

FIG. 6 illustrates the connectivity between various digital TV/computers, the satellite 10, and local and long distance fiber optic networks. As can be seen, the digital TV/computer designated 140 has a direct connection (DC) to a local fiber-optic line and network which in turn is connected through a telephone or cable company 142 to a regional fiber network. The regional fiber network is connected via a long distance or cable company 144 to a long distance fiber network. The long distance fiber network is connected to a further telephone or cable company 146 (or other entity) which in turn is connected to a distribution node 148. The distribution node 148 includes the gateway 76 and is thereby connected via one or more of the satellites 10 (or one of the GSO or MEO satellites 11) to the antenna 78c, RF section 78b and interface 78a of the PC 78 (refer also to FIG. 1). The connection between the antenna 78c and the RF section 78b can be a wired or a wireless connection. In this manner, the PC 78 is enabled to be coupled to the fiber network in essentially the same manner as the digital TV/computer 140 which has a direct connection to the fiber-optic network, and is thus enabled to avail itself of network and other services that are best served by the higher data rates made available by fiber optic lines.

The PC 78 can thus be connected to others of similar type in a mesh network, or in a star network, to the distribution node 148 and thence to the serving entity such as the telephone or cable company. Further connections to the PSTN can also be made. The further connections can be to other computers of similar type, to servers and/or to larger computers providing network (e.g., Internet) services.

The antenna 78c may be directional, but is preferably omni-directional with hemispherical or semi-hemispherical coverage.

The use of the LEO constellation of satellites 10 provides unique advantages when employed with the teaching of this invention. Consider a mobile terminal which is moving under a tree (or other RF obstacle, such as a building) and is blocked to one of several satellites 10 serving the user (i.e., assume that the mobile terminal is located in the overlap region of the coverage areas shown in FIG. 3). The use of diversity combining from those satellites that are not blocked provides improved service and connectivity to the satellite constellation. It can be shown that this performance increase is significant and provides mitigation of shadowing and blocking due to movement of the user terminal. In this regard the disclosure of U.S. Pat. No. 5,233,626, issued Aug. 3, 1993, entitled "Repeater Diversity Spread Spectrum Communication System", to Stephen A. Ames is incorporated by reference herein in its entirety for illustrating suitable embodiments of a receiver employing diversity combining.

When considering a LEO fixed system, the rain attenuation can be severe in the frequency bands above 3 GHz, and especially above 10 GHz. Rain fades of 20 db or more occur in the Ka band frequencies. It is widely known that the availability of satellite systems to deliver signals of the desired strength is affected by these rain fades. It is also known by experimentation that the duration and fade depth is affected by the rainfall zone that the user is in (deserts have much improved availability as compared to tropical forest areas). Furthermore, "rain cells", i.e., local rain zones around the user, have characteristics which cause rapidly changing conditions near user sites. In fact, for fixed locations operating with GSO satellites a significant amount of analysis has been done in predicting the availability of signals due to rain attenuation. Since the rain cells cannot be avoided a certain percentage of the time from coming between the fixed user and a GSO satellite there is not much the fixed user can do to compensate for the rain fade. In the past, it has been known to provide excessive margin to partially overcome theses attenuations, and in some cases to utilize another site located 35 to 50 or more miles away, to provide a "diversity" site. Switching between these two sites can increase the system signal availability. However, for a home or office user it is not practical to provide such a diversity site.

In accordance with an aspect of this invention, by providing more signal paths to the user from two or more of the satellites 10 at different and changing azimuth and elevation angles, the effect is to provide the "diversity site" at a single location. In effect it is the opposite of the mobile user moving under the blocking obstruction, as the rain cell moves with respect to the user terminal site. One suitable diversity-type of receiver is described in the above-mentioned U.S. Pat. No. 5,233,626, issued Aug. 3, 1993, entitled "Repeater Diversity Spread Spectrum Communication System, to Stephen A. Ames.

Although described above in the context of specific frequency bands, bandwidths, data rates and the like, it should be realized that these are exemplary, and not limiting, embodiments of this invention. By example only, one or more of the Ka-band links shown in FIG. 1 could be replaced by a Ku-band link. Furthermore, the teaching of this invention can be practiced with but one LEO satellite, or with one LEO satellite and one GSO or MEO satellite. However, it is preferred to use larger numbers of satellites to provide a wide area coverage, while also enabling the use of the above-mentioned diversity reception techniques by the subscriber terminals and equipment.

Thus, while the invention has been particularly shown and described with respect to preferred embodiments thereof, it will be understood by those skilled in the art that changes in form and details may be made therein without departing from the scope and spirit of the invention.

What is claimed is:

1. A communication system, comprising:

at least one first satellite;

at least one second satellite in a higher orbit than said at least one first satellite; and a ground segment comprising a Plurality of user transceivers and at least one gateway coupled to a terrestrial communications system comprised of fiber optic infrastructure, said at least one gateway comprising a gateway transceiver for bidirectionally coupling said at least one gateway to said at least one first satellite; wherein a plurality of said user transceivers each comprising a data processor that is bidirectionally coupled to said fiber optic infrastructure through said first and second satellites and said at least one gateway, wherein communications between one of said user transceivers and said fiber optic infrastructure are switched on-board said first satellite and carried by inter-satellite links that are coupled to said second satellite, wherein said at least one first satellite comprises a first transceiver for communication with said at least one gateway, a second transceiver for communication with at least one user transceiver, and a third transceiver for communication with said at least one second satellite, said first, second and third transceivers being switchably coupled together on-board said first satellite for relaying a user communication between said at least one gateway and said at least one user transceiver via said at least one second satellite.

2. A communications system as set forth in claim 1, wherein said at least one gateway transmits digital information to and receives digital information from said at least one first satellite, the digital information being comprised of at least one of voice, data, video and image.

3. A communications system, comprising:

at least one first satellite;

at least one second satellite in a higher orbit than said at least one first satellite; and a ground segment comprising a plurality of user transceivers and at least one gateway coupled to a terrestrial communications system comprised of fiber optic infrastructure, said at least one gateway comprising a gateway transceiver for bidirectionally coupling said at least one gateway to said at least one first satellite; wherein a plurality of said user transceivers each comprising a data processor that is bidirectionally coupled to said fiber optic infrastructure through said first and second satellites and said at least one gateway, wherein communications between one of said user transceivers and said fiber optic infrastructure are switched on-board said first satellite and carried by inter-satellite links that are coupled to said second satellite;

wherein said at least one first satellite comprises a first transceiver for communication with said at least one gateway, a second transceiver for communication with at least one user transceiver, and a third transceiver for communication with said at least one second satellite, said first, second and third transceivers being switchably coupled together on-board said first satellite for relaying a user communication between said at least one gateway and said at least one user transceiver via said at least one second satellite;

wherein said at least one first satellite further comprises a first on-board processor that is bidirectionally coupled to said first transceiver; a second on-board processor that is bidirectionally coupled to said second transceiver; and a switching network that is bidirectionally coupled to said first and second on-board processors and to said third transceiver for selectively establishing communication paths between said first and second on-board processors and said third transceiver.

4. A communications system as set forth in claim 1, wherein said terrestrial communications system is comprised of a public switched telephone network.

5. A communications system as set forth in claim 2, wherein said at least one gateway transmits and receives the digital information using a direct sequence, code division/multiple access technique.

6. A communications system, comprising:

a constellation of first satellites in a non-geosynchronous orbit;

at least one second satellite in a higher orbit than said first satellites; and a ground segment comprising a plurality of user transceivers and at least one gateway coupled to at least one terrestrial communications system, said gateway having an associated service area within which at least one of said user transceivers is located; wherein each of said first satellites comprises a first transceiver for communication with said gateway, a second transceiver for communication with a first type of user transceiver located within said gateway coverage area, and a third transceiver for communication with said second satellite, said first, second and third transceivers being coupled to a switching matrix for selectively routing communications traffic between said gateway and said first type of user transceiver via said second satellite, wherein said communications traffic is comprised of a video communications;

wherein each of said first satellites is further comprised of a fourth transceiver for communication with a second type of user transceiver located within said gateway coverage area, said fourth transceiver also being coupled to said switching matrix.

7. A communications system, comprising:

a constellation of first satellites in a non-geosynchronous orbit;

at least one second satellite in a higher orbit than said first satellites; and a around segment comprising a plurality of user transceivers and at least one gateway coupled to at least one terrestrial communications system, said gateway having an associated service area within which at least one of said user transceivers is located; wherein each of said first satellites comprises a first transceiver for communication with said gateway, a second transceiver for communication with a first type of user transceiver located within said gateway coverage area, and a third transceiver for communication with said second satellite, said first, second and third transceivers being coupled to a switching matrix for selectively routing communications traffic between said gateway and said first type of user transceiver via said second satellite, wherein said communications traffic is comprised of a packet switched communication, wherein each of said first satellites is further comprised of a fourth transceiver for communication with a second type of user transceiver located within said gateway coverage area, said fourth transceiver also being coupled to said switching matrix.

8. A communications system, comprising:

a constellation of first satellites in a non-geosynchronous orbit;

at least one second satellite in a higher orbit than said first satellites; and a ground segment comprising a plurality of user transceivers and at least one gateway coupled to at least one terrestrial communications system, said gateway having an associated service area within which at least one of said user transceivers is located; wherein each of said first satellites comprises a first transceiver for communication with said gateway, a second transceiver for communication with a first type of user transceiver located within said gateway coverage area, and a third transceiver for communication with said second satellite, said first, second and third transceivers being coupled to a switching matrix for selectively routing communications traffic between said gateway and said first type of user transceiver via said second satellite, wherein said communications traffic is comprised of a circuit switched communication, wherein each of said first satellites is further comprised of a fourth transceiver for communication with a second type of user transceiver located within said gateway coverage area, said fourth transceiver also being coupled to said switching matrix.

9. A communications system, comprising:

a constellation of first satellites in a non-geosynchronous orbit;

at least one second satellite in a higher orbit than said first satellites; and a around segment comprising a plurality of user transceivers and at least one gateway coupled to at least one terrestrial communications system, said gateway having an associated service area within which at least one of said user transceivers is located; wherein each of said first satellites comprises a first transceiver for communication with said gateway, a second transceiver for communication with a first type of user transceiver located within said gateway coverage area, and a third transceiver for communication with said second satellite, said first, second and third transceivers being coupled to a switching matrix for selectively routing communications traffic between said gateway and said first type of user transceiver via said second satellite, wherein said communications traffic is comprised of an Internet communication, wherein each of said first satellites is further comprised of a fourth transceiver for communication with a second type of user transceiver located within said gateway coverage area, said fourth transceiver also being coupled to said switching matrix.

* * * * *

UNITED STATES PATENT AND TRADEMARK OFFICE
CERTIFICATE OF CORRECTION

PATENT NO. : 6,160,994

DATED : December 12, 2000

INVENTOR(S) : Robert A. Wiedeman

It is certified that error appears in the above-identified patent and that said Letters Patent is hereby corrected as shown below:

Claim 7, line 43, delete "around" and insert --ground--

Claim 9, line 3, delete "around" and insert --ground--

Signed and Sealed this

Eighth Day of May, 2001

*Attest:*

NICHOLAS P. GODICI

*Attesting Officer*      *Acting Director of the United States Patent and Trademark Office*